March 11, 1924.  
F. A. BAUM  
CASTER  
Filed Aug. 17, 1922  
1,486,217
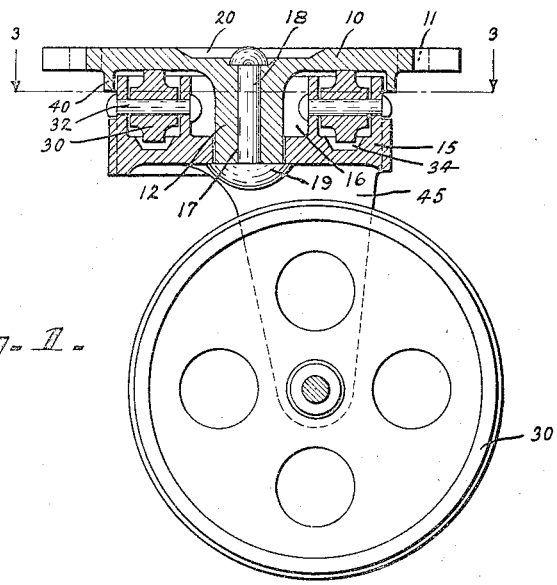
Fig. 1.
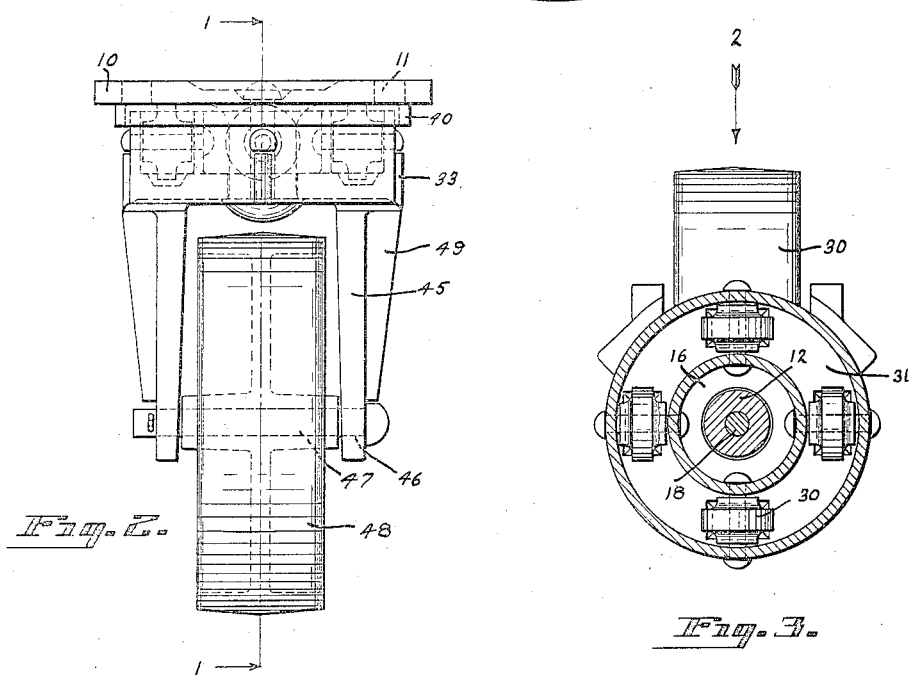
Fig. 2.
Fig. 3.
Witnesses  
Charles E. Greene
Inventor  
Frank A. Baum  
By Greer Maréchal  
Attorney Patented Mar. 11, 1924.

1,486,217

UNITED STATES PATENT OFFICE.

FRANK A. BAUM, OF HAMILTON, OHIO.

CASTER.

Application filed August 17, 1922. Serial No. 582,483.

*To all whom it may concern:*

Be it known that I, FRANK A. BAUM, a citizen of the United States of America, residing at Hamilton, Butler County, Ohio, have invented certain new and useful Improvements in Casters, of which the following is a full, clear, and exact description.

This invention relates to casters, and more particularly to an improved form of caster for use on furniture, factory trucks, and the like.

One of the principal objects of the invention is to provide a caster, of this character, which is simple in construction, and therefore easily and cheaply manufactured, and is provided with lubricant retaining means, thus insuring easier operation and longer life.

Other objects and advantages of the invention will be apparent from the description set out below when taken in connection with the accompanying drawing.

In the drawing in which like characters of reference designate like parts throughout the several views thereof;

Fig. 1 is a sectional view through a caster constructed in accordance with this invention, the section being in the plane indicated by the line 1—1 of Fig. 2;

Fig. 2 is an elevational view of this form of caster, looking in the direction of the arrow in Fig. 3; and Fig. 3 is a view partly in section, and partly in plan, the section being in a plane represented by the line 3—3 of Fig. 1.

This caster comprises as one of the principal elements a plate 10, which is constructed for attachment to a piece of furniture, a factory truck, or the like. Any suitable means for attaching this plate may be utilized, although as shown, in dotted lines, by the numeral 11, holes are provided for receiving screws or bolts for accomplishing this attachment. Carried by the plate 10 is a downwardly projecting or depending stem 12 which is, as shown in the drawing, preferably formed integral with the plate, although this construction is not essential. Cooperating with the plate 10 is a housing designated generally by the numeral 15, which has a centrally arranged opening or passage 16 therethrough, adapted to receive the depending stem 12, when the caster is operatively assembled. The housing member 15 and the plate 10, when the caster is assembled, are secured together, the construction being such that the two members are readily rotatable relative to each other. A preferred method of thus rotatably securing these two members together as shown in the drawing, comprises the stem 12, extending downwardly through the opening 16 and terminating substantially flush with the lower face of the housing, this stem having a passage 17 therein within which is positioned a bolt or rivet 18, the head 19 of which is extended to form a plate like member cooperating with the lower end of the stem and the lower face of the housing 15, the upper end of the rivet being beaded over, to lock the two members 10 and 15 rotatably together. Of course it is not essential that a bolt with riveted ends, of the character shown be used, but any suitable and equivalent type of bolt, or other means for effecting this connection, may be used. As shown the upper face of the plate 10 is preferably cut away to provide a socket, designated generally by the numeral 20, to receive and house the upper head of the bolt 18.

The two members 10 and 15 are spaced apart by means of a plurality of rollers 30 which are mounted within a circular pocket or recess 31, within the member 15, this pocket or recess being in the shape of a circular trough. Each of the rollers 30 is rotatably mounted upon a shaft or pin 32, each shaft extending at its opposite ends through suitable openings in the walls of the pocket and having the ends so constructed as to lock these shafts in position. As shown the opposite ends of the shafts are riveted, but other means may be used for holding them in place. Preferably the passage 16 is of greater diameter at its upper end, to give a space, surrounding the depending flange 12, for receiving the inner ends or heads of the shafts 32. The housing 15, adjacent the outer end of each of the shafts 32, is provided with a lug or projection 33, the upper end of each lug forming a shoulder adapted to cooperate with a flattened face of the head of the corresponding shaft to lock that shaft against rotation, this construction being clearly shown in Figs. 1 and 2. As shown the recess or pocket 31 is cut away, as at 34, to form sockets, this construction being such that the roller faces do not contact with the housing 15, free rotation being thus effected. If desired the sockets 34 need not be used, but the pocket 31 may be made sufficiently deep to prevent contacting of the roller faces with the housing 15, but by using these pockets a more compact structure is secured, and one which weighs less for a given strength and size than where the pockets are dispensed with and the recess 31 is made sufficiently deep to house the rollers. As shown the rollers extend upwardly above the upper face of the housing 15 thus contacting with the lower face of the plate 10 and supporting that plate out of contact with the upper face of the housing member, a construction which permits of ready rotation of the two principal members of the caster relative to each other.

Not only is the pocket or recess 31 adapted to house the rollers, but it is also adapted to receive a quantity of grease, or other lubricant. Since this pocket or recess is open only at the top, any lubricant which is placed therein will remain in place, and because of the relatively slow movements of the various parts, including the rollers, a supply of lubricant will last generally throughout the effective life of the caster, certainly for several years, before it needs renewal.

The plate 10 is provided with a circular depending flange 40, which serves to prevent ingress of dirt, and the like, through the space between the upper face of the housing 15, and the lower face of the plate 10. The effective life of the caster is thus greatly prolonged, since one of the most destructive agencies to which a caster of this character is subjected is the abrasive action of the dust or dirt which collects upon the working parts of the caster. By providing this caster with the depending circular flange 40, which is constructed to fit as snugly about the upper end of the housing 15 as may be without causing interference with free rotation of the parts of the caster, a construction is provided which is substantially dust and dirt tight. Consequently when the caster has been assembled with the pocket or recess 31 filled with grease, and the housing 15 and plate 10 have been locked together, with the locking plate 19 preventing passage of dust or dirt upwardly through the passage 16, then long life of the caster is assured.

The housing 15 is provided with depending horns or legs 45, having suitably aligned openings 46 therein, within which is positioned a shaft or axle 47, having a wheel 48 rotatably mounted thereon. The horns 45 are provided with perpendicularly arranged flanges or fins 49 which serve the double function of giving sufficient strength to these parts while permitting cutting down in the weight thereof, and at the same time by co-operating, at their lower ends, with a flattened portion of one, or both heads of the axle 47 to lock that axle against rotation.

While the form of apparatus herein described constitutes a preferred embodiment of the invention, it is to be understood that the invention is not limited to this precise form of apparatus, and that changes may be made in the same without departing from the scope of the invention which is defined in the appended claims.

What is claimed is:

1. A caster of the character described comprising a plate, constructed for attachment to a truck or the like, a depending stem carried by said plate; a wheel bearing housing having a centrally arranged passage therethrough for receiving said depending stem, means for locking the housing and the depending stem rotatably together, a wheel rotatably mounted upon said housing; said housing also having a circular pocket therein surrounding said passage but separate therefrom, and a plurality of rollers within said recess or pocket, constructed to rotatably support the said plate.

2. A caster of the character described comprising a plate, constructed for attachment to a truck or the like, a depending stem carried by said plate; a housing having a centrally arranged passage therethrough for receiving said depending stem, means for locking the housing and the depending stem rotatably together, a wheel rotatably mounted upon said housing; said housing also having a circular pocket therein, a plurality of rollers within said pocket, constructed to rotatably support the said plate; and a circular flange carried by said plate and surrounding the upper ends of the outer wall of the said pocket to prevent the ingress of dirt and the like into said pocket.

3. A caster of the character described comprising a plate, constructed for attachment to a truck or the like, a depending stem carried by said plate; a housing having a centrally arranged passage therethrough for receiving said stem, means for locking the housing and depending stem rotatably together, said housing having a circular pocket therein; a plurality of rollers mounted within said pocket, said rollers being so mounted as to contact with the lower face of the said plate, and support that plate, and the truck or the like to which it is attached; a circular depending flange carried by said plate and surrounding the upper end of the outer wall of the said pocket to prevent the ingress of dirt and the like into said pocket; and a wheel rotatably mounted upon said housing.

4. A caster of the character described comprising a plate, constructed for attachment to a truck or the like, a depending stem carried by said plate; a housing having a centrally arranged passage therethrough for receiving said depending stem, means for locking the housing and depending stem rotatably together, said housing also having a circular pocket therein constructed to contain a supply of lubricant; a plurality of rollers within said pocket, a supporting shaft passing through each of said rollers and having its opposite ends mounted within the opposite walls of the said pocket, said rollers being so mounted as to contact with the lower face of the said plate and support that plate out of contact with the upper face of the housing, the mounting of the rollers being also such that their rolling faces do not contact with the housing member; and a wheel rotatably mounted upon said housing.

5. A caster of the character described comprising a plate, constructed for attachment to a truck or the like, a depending stem carried by said plate; a housing having a centrally arranged passage therethrough for receiving said depending stem, means for locking the housing and depending stem rotatably together, said housing also having a circular pocket therein surrounding said passage and constructed to contain a supply of lubricant; a plurality of rollers within said pocket, a supporting shaft passing through each of said rollers and having its opposite ends mounted within the opposite walls of the said pocket, said rollers being so mounted as to contact with the lower face of the said plate, and support that plate out of contact with the upper face of the housing, the mounting of the rollers being also such that their rolling faces do not contact with the housing member; a circular depending flange carried by said plate and surrounding the upper end of the outer wall of the said pocket to prevent the ingress of dirt and the like into the said pocket.

6. A caster of the character described comprising a plate constructed for attachment to a truck or the like, a depending stem carried by said plate; a wheel bearing housing, an upstanding flange carried by said housing, a second upstanding flange carried by said housing and spaced inwardly from the first said flange to form a circular pocket between the two said flanges constructed to contain lubricant, and a passage inside the said second flange within which the depending stem is positioned, the housing having a centrally arranged opening to receive the lower end of said stem, means for locking the housing and stem rotatably together; a roller mounted in said circular pocket, positioned to cooperate with the said plate; and a depending flange carried by said plate and surrounding the first named upstanding flange to prevent the ingress of dirt into said circular pocket.

In testimony whereof I hereto affix my signature.

FRANK A. BAUM.